(12) United States Patent
Charters et al.

(10) Patent No.: US 8,655,700 B2
(45) Date of Patent: Feb. 18, 2014

(54) METHOD AND SYSTEM FOR GROUPING EVENTS

(75) Inventors: Graham Castree Charters, Southampton (GB); Amanda Elizabeth Chessell, Alton (GB); Michael Friess, Baden-Wurthenberg (DE); Vernon Maurice Green, Newbury (GB)

(73) Assignee: International Business Machines Corporation, Armonk, NY (US)

( * ) Notice: Subject to any disclaimer, the term of this patent is extended or adjusted under 35 U.S.C. 154(b) by 3162 days.

(21) Appl. No.: 11/169,084

(22) Filed: Jun. 28, 2005

(65) Prior Publication Data

US 2006/0004597 A1   Jan. 5, 2006

(30) Foreign Application Priority Data

Jun. 30, 2004 (GB) .................................. 0414625.4

(51) Int. Cl.
*G06Q 10/00* (2012.01)
(52) U.S. Cl.
USPC ....... 705/7.15; 705/7.14; 705/7.22; 705/7.26; 705/7.27
(58) Field of Classification Search
USPC .................... 705/7.14, 7.22, 7.26, 7.27, 7.15
See application file for complete search history.

(56) References Cited

U.S. PATENT DOCUMENTS

| | | | | |
|---|---|---|---|---|
| 5,774,661 A * | 6/1998 | Chatterjee et al. | ............ | 709/203 |
| 5,826,239 A * | 10/1998 | Du et al. | ............ | 705/8 |
| 5,864,875 A * | 1/1999 | Van Huben et al. | ............ | 707/200 |
| 5,870,545 A * | 2/1999 | Davis et al. | ............ | 709/201 |
| 5,974,392 A * | 10/1999 | Endo | ............ | 705/8 |
| 6,289,513 B1 * | 9/2001 | Bentwich | ............ | 717/106 |
| 6,367,034 B1 | 4/2002 | Novik et al. | ............ | 714/39 |
| 6,445,774 B1 * | 9/2002 | Kidder et al. | ............ | 379/9.03 |
| 7,206,851 B2 * | 4/2007 | Delaney et al. | ............ | 709/229 |
| 2004/0093523 A1 * | 5/2004 | Matsuzaki et al. | ............ | 713/201 |
| 2005/0028073 A1 * | 2/2005 | Henry et al. | ............ | 715/500 |
| 2005/0201392 A1 * | 9/2005 | Tam et al. | ............ | 370/401 |
| 2006/0143034 A1 * | 6/2006 | Rothermel et al. | ............ | 705/1 |

OTHER PUBLICATIONS

Abeta, Akira and Kakizaki, Ken'ichi, Operation Record based Work Events Grouping Method for Personal Information Management System, 1998, IEEE, $22^{nd}$ International Computer Software and Applications Conference, pp. 548-555.*

Hollingsworth, David, Workflow Management Coalition The Workflow Reference Model, 1995, Workflow Management Coalition.*

* cited by examiner

*Primary Examiner* — Jonathan G Sterrett
*Assistant Examiner* — Stephen S Swartz
(74) *Attorney, Agent, or Firm* — Steven Greenberg, Esq.; Carey, Rodriguez, Greenberg & O'Keefe (57) ABSTRACT

A method and system for grouping events is provided in which a plurality of base groups (303) each define a set of event points. Combined groups (304) have a set of event points defined by the combination of the event points in combining groups. The combination may be by a union of groups or an exclusion of groups and may combine base groups (303) and/or combined groups (304) together. The method and system activate or deactivate groups to enable or disable the generation of events defined by the event points in a group. The generation of events may record event instances (306) of the event points for analysis, to provide an alert for an event instance of predetermined value, to trigger a further event or activity, or to publish the event instances for the event points.

22 Claims, 6 Drawing Sheets

METHOD AND SYSTEM FOR GROUPING EVENTS

BACKGROUND OF INVENTION

This invention pertains to computers and other information technology systems and, more particularly, to monitoring and managing events in such systems.

An event occurs when something significant happens in an information technology (IT) system. For example, an event may be a business event, such as an application processing a new client order, or a system based event, such as a failure occurring in a critical part of the system.

An event infrastructure provides the runtime environment to persistently store and retrieve events from many different programming environments. An application creates an event object whenever something happens that either should be recorded for later analysis, or which may require additional work to be triggered.

An event infrastructure can be a shared component, for example, inside or outside a WebSphere Application Server (WebSphere is a trade mark of International Business Machines Corporation). The infrastructure provides means to store, update and distribute events to event consumers, for example, by categorising events by topics.

The Common Base Event model is a standard defining a common representation of events that is intended for use by enterprise management and business applications. This standard, developed by the IBM Autonomic Computing Architecture Board, provides a consistent unified format for the creation, transmission, persistence and distribution of a wide range of business, system and network events. The standard uses a common XML-based format, making it possible to correlate different types of events that originate from different applications.

There are a number of existing infrastructures for managing events (e.g. product trace, operating system debug trace, Tivoli TEC). These events are typically used to collect and report on error situations within the IT infrastructure. Event points can normally be activated or deactivated to determine which events should be recorded.

To simplify the administration of these points, the product or operating system can also group points together. Different techniques are used to group related events. For example, one option is for a product to group events by component. Another option is to arrange events in a hierarchy; grouping is then by level within the hierarchy. Yet another alternative is for the user to define a group and then manually associate known trace points with the group.

The problem with defining groups is how to manage them when they need updating to add new event points or to remove event points. These additions may be of a permanent or temporary nature. Apart from updating groups with required changes, one solution to this is to define multiple groups that are very similar, but have entries added or removed to produce the required pattern. Then, the appropriate group is used when the event logging is activated. This is difficult to manage.

SUMMARY OF THE INVENTION

According to a first aspect of the present invention there is provided a method for grouping events comprising: defining a plurality of base groups each defining a set of event points; combining groups to form a combined group having a set of event points defined by the combination of the event points in the combining groups; and activating or deactivating groups to enable or disable the generation of events defined by the event points in a group.

The step of combining groups may combine any combination of base groups, combined groups and event points. In this way a hierarchy of groups may be defined.

Preferably, the step of combining is in accordance with predefined combining rules including a union of groups and an exclusion of groups. A further rule may be that if an event point is defined in more than one combining group, the entry of the event point in the last combining group in the combination is used. Event points may be defined in groups by unique event identifiers.

Each group may have an activity status of active or inactive and event instances may be monitored for event points in groups which are active. The activity status of combining groups may change the event points defined in a combined group. The activity status may be defined by the group at the highest level.

The generation of events may result in one or more of the following activities: recording event instances of the event points for analysis; providing an alert for an event instance of predetermined value; triggering a further event or activity; and publishing the event instances for the event points.

The events may be system events or business events and may be in local or distributed computing environments.

According to a second aspect of the present invention there is provided a system for grouping events comprising: means for defining a plurality of base groups each defining a set of event points; means for combining groups to form a combined group having a set of event points defined by the combination of the event points in the combining groups; and means for activating or deactivating groups to enable or disable the generation of events defined by the event points in a group.

The system may include means for managing groups including means for creating, viewing, deleting and updating groups. The system may also include means for searching in a monitored environment for event points defined in activated groups.

The system may include one or more of: means for recording event instances of the event points for analysis; means for providing an alert for an event instance of predetermined value; means for triggering a further event or activity in response to an event instance; and means for publishing event instances.

The system is preferably an event monitoring system and the events are business events.

According to a third aspect of the present invention there is provided a computer program product stored on a computer readable storage medium, comprising computer readable program code means for performing the steps of: defining a plurality of base groups each defining a set of event points; combining groups to form a combined group having a set of event points defined by the combination of the event points in the combining groups; and activating or deactivating groups to enable or disable the generation of events defined by the event points in a group.

BRIEF DESCRIPTION OF THE DRAWINGS

Embodiments of the present invention will now be described by way of examples only, with reference to the accompanying drawings in which.

DESCRIPTION OF THE ILLUSTRATIVE EMBODIMENTS

Figure 1:
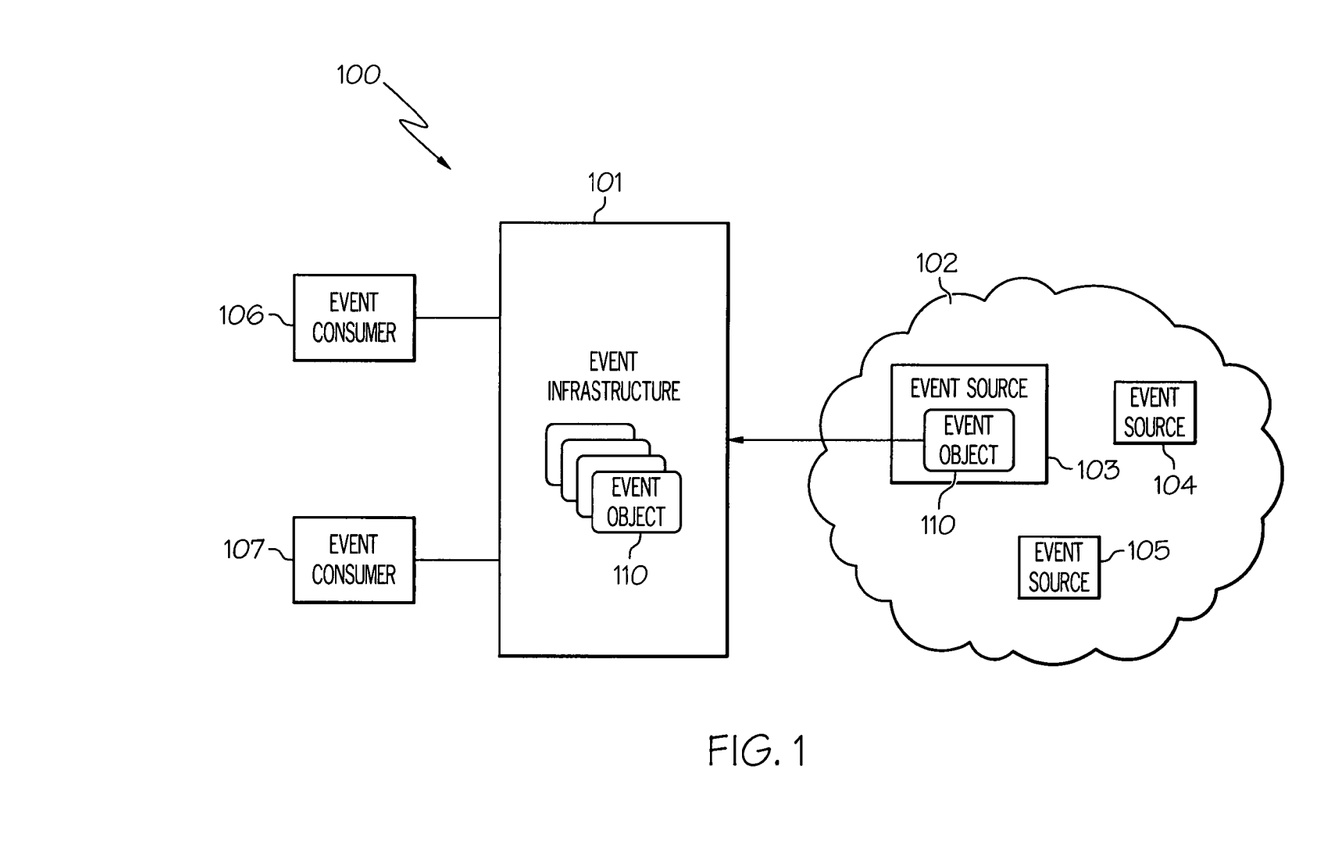
FIG. 1 is a block diagram representing a system with an event infrastructure for grouping events in accordance with the present invention.

Referring to FIG. 1, a system 100 with an event infrastructure 101 is shown. A monitored environment 102 may include a plurality of components such as applications 103, 104, 105, which may be running on distributed computer systems, on a single system, or on a combination of local and distributed systems. In distributed computer systems, each local system can communicate with a shared event infrastructure 101, for example, via network communications means.

In a specific embodiment, the event infrastructure 101 may reside within an application server, for example, a WebSphere application server. Alternatively, the event infrastructure 101 may be external to an application server. The event infrastructure 101 manages events notified from the monitored environment 102. The event infrastructure 101 may process event information itself or, alternatively, event consumers 106, 107 can obtain information on events from the event infrastructure 101, for example, categorized by topic.

The event infrastructure 101 provides the runtime environment to persistently store and retrieve events from the different applications in the monitored environment. An application 103, 104, 105 creates an event object 110 whenever something happens that should be recorded for later analysis, which may require additional work to be triggered or which may require authorisation to be given, or any other reason for a user to be informed of an event occurrence.

This event object 110 can describe the event type, when the application generated the event and a number of properties that are relevant to the event. The application 103, 104, 105 creating the event object is called the event source. The event source passes the event object 110 to the event infrastructure 101 where data from the event object 110 is aggregated with information from the execution environment and an event catalog.

Event points defined in the monitored environment 102 can normally be activated or deactivated to determine which events should be recorded by the event infrastructure 101. To simplify the administration of these event points, the event infrastructure can group event points together. Defined groups need managing to update them to add new event points or to remove event points. These additions and deletions may be of a permanent or temporary nature.

The described method and system provides a means of defining multiple, interrelated groups that have different entries in a required pattern to monitor event points. The appropriate group is used when the event logging is activated to record the events defined in the group.

Each component in a solution, for example, each application 103, 104, 105, describes the events it can produce. This can be by a list of unique names of the events. These events are then associated with event groups. An event group is a collection of related events which, as individuals, are typically of limited value but, taken as a whole, solve a particular monitoring goal. A business would typically wish to have all these events generated/retrieved by the event infrastructure 101, or none.

Event groups can be used to turn on/off event generation and all events associated with the group would be enabled simultaneously. Later, when events are being analyzed it may be useful to know what events (i.e., as defined by the groups) were being enabled. This could be achieved by including information about the groups in the event infrastructure.

Event groups can also be used to activate or deactivate event publishing in which occurrences of events are published to a remote or local component of the system.

There are occasions when it is necessary to be able to generate or retrieve different subgroups from within the group. For example, a component could be provided with one or more predefined groups that define all the event points the component might be capable of producing. Rather than change the predefined groups, a method is required that provides the ability to override the standard behavior by defining additional groups.

This is provided by using nested groups and defining rules on the relationships of these nested groups. By combining groups in this way, event points or groups of event points can be logically added or subtracted from the base group.

The implementations of deployed run-times and components that support the generation of events will produce events that belong to different groups. To manage these groups, means are provided to simplify the activation or deactivation of event points or groups of event points by nesting groups and event points.

Figure 2:
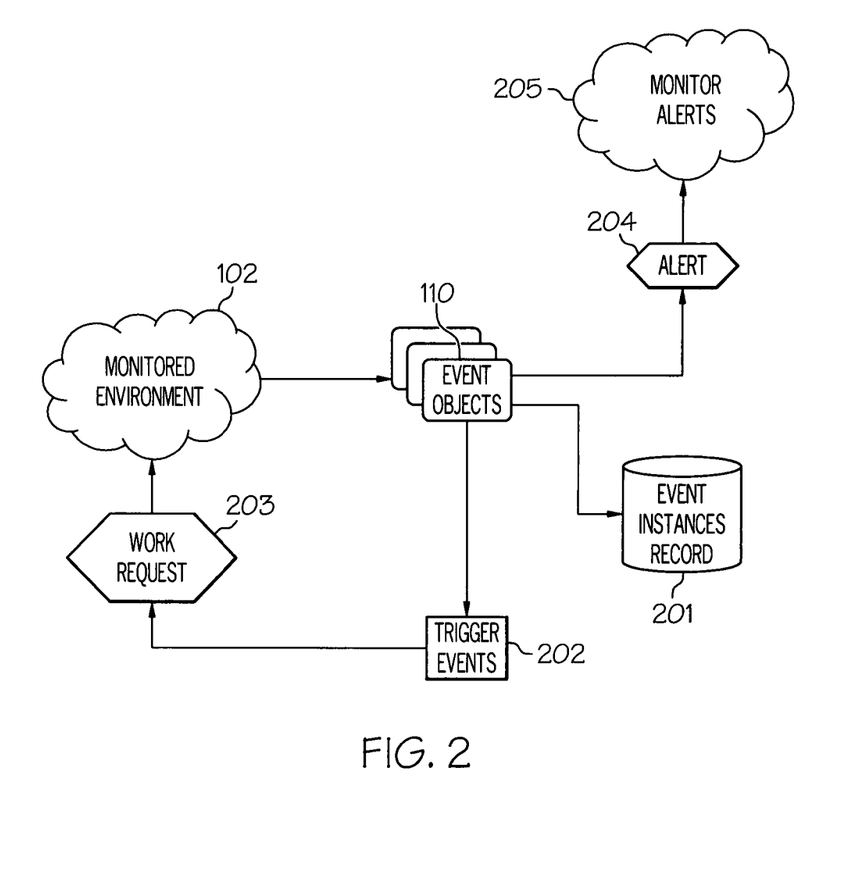
FIG. 2 is a block diagram schematically showing events generated in accordance with the present invention.

Referring to FIG. 2, event objects 110, which provide details of event instances, are generated from a monitored environment 102 and can be used for one or more different purposes. The event objects 110 can be used for recording event instances in a record 201 for later analysis. The event objects 110 can also be used to trigger other events 202, such as additional work requests 203 to be carried out in the monitored environment 102 or elsewhere. As another option, the event objects 110 can be used to generate an alert 204, and such alerts 204 can be monitored 205 by users or applications.

In an exemplary embodiment, alerts 204 could be used for authorization. An alert 204 could be raised whenever a high value order is raised in a business that would be classified as a significant business event. A high value may be measured either by monetary value or quantity. The alert may be used to authorize the order. This is useful if it means committing significant costs to meet the order and a check can be run as to whether or not the customer is known and good for the order. If there is insufficient stock in hand, the alert could be used to request an expedited order to replenish stock, or if the company had their own production facility, it could be used to increase the production rate to meet the order.

Groups of types of events can be set up to enable different events to be active and generated, depending upon a business need. For example, a business may want to have alerts for authorization and to trigger events activated, but might decide to reduce the number of events recorded by disabling some groups.

Figure 3:
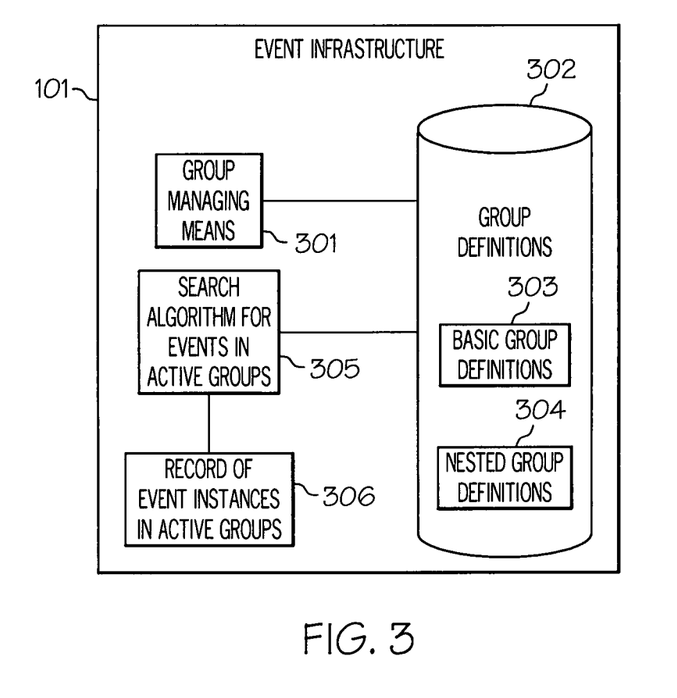
FIG. 3 is a block diagram showing the components of the event infrastructure of FIG. 1.

Referring to FIG. 3, a more detailed representation of an event infrastructure 101 is shown. The event infrastructure 101 includes a group managing means 301 for defining and maintaining the groups of events to be monitored. The group managing means 301 is for creating, viewing, updating and deleting groups of events. The group definitions are stored in a record 302 such as, for example, a database or a flat file, which includes definitions of basic groups 303 and nested groups 304. Nested groups 304 can be defined by a combination of basic groups, other nested groups and event points. Each group can therefore contain event points, groups or a combination of event points and groups. The group managing means 301 updates the group definitions in the record 302 as these change. The group managing means 301 can dynamically redefine the groups during monitoring, if required.

In addition, a search algorithm 305 is used to search for events of active groups in the monitored environment. A record 306 is maintained of the event instances of the active groups as they are monitored. The event instances can be used for various purposes as shown in FIG. 2.

Figure 4:
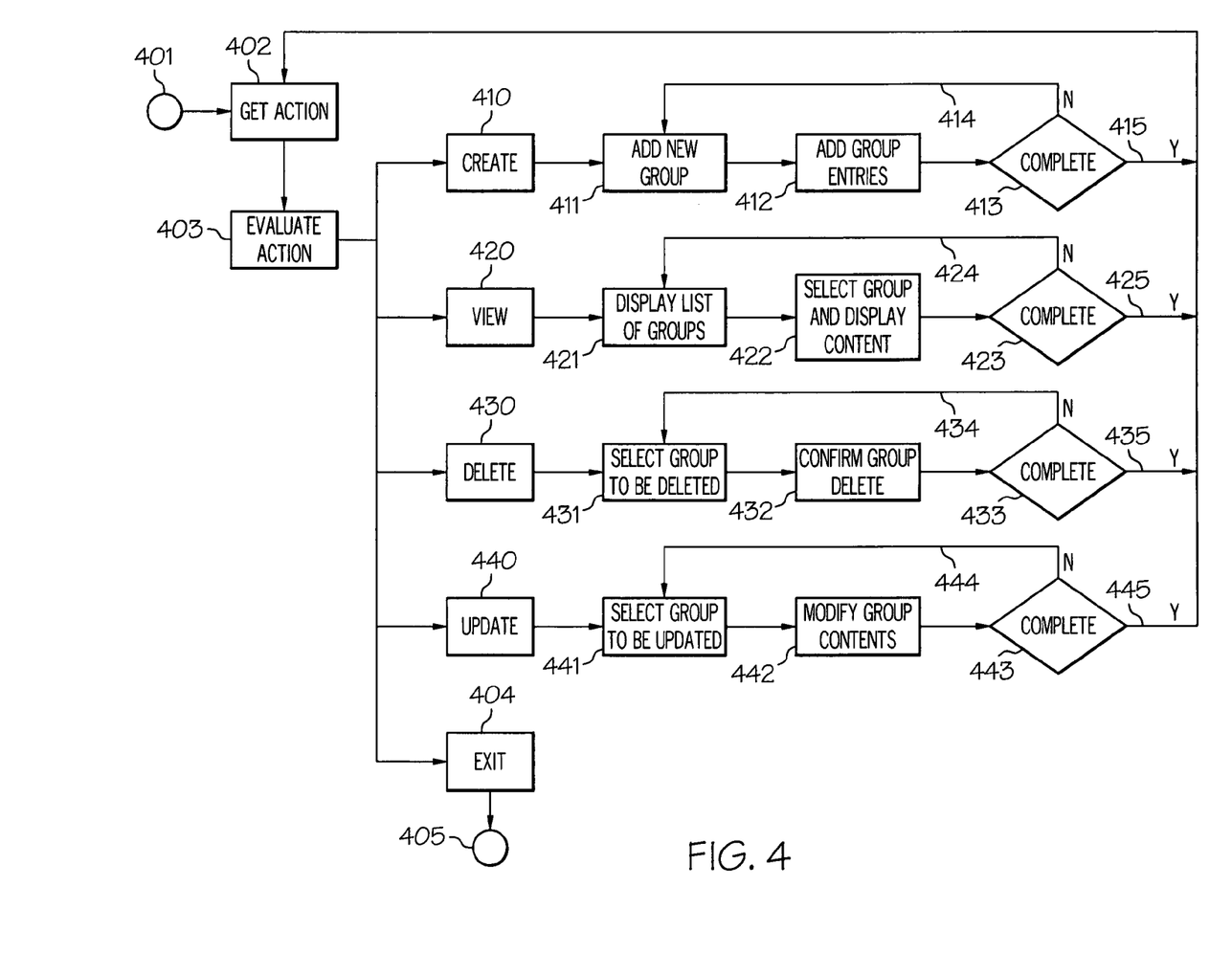
FIG. 4 is a flow diagram showing the management of groups of events in accordance with the present invention.

The group managing means 301 of the event infrastructure 101 may manage the groups as shown in the simplified flow diagram of FIG. 4, which shows a typical create, view, update and delete resource management. At the start 401 of a management process, a "Get Action", command 402 and an "Evaluate Action" command 403 are received, and the nature of the action required by the group managing means 301 is determined.

If the action is to create a new group 410, a new group is added to the record of groups 411. Group entries are added 412 within the newly defined group. For each new set of group entries added 412, it is then determined if there are any additional groups to add 413, if the more groups are to be added, the process loops 414 to add the next new group 411. If a new group is a basic group, the entries added are the event identifiers. If the new group is a nested group, the entries can be added as a definition of a combination of other groups. Nested groups may also include entries for event identifiers. Once the new group definition is complete 415, the process awaits the next "Get Action" 402 command.

If the action is to view a group 420, the list of groups is displayed 421 and a group is selected and its content is displayed 422. It is determined if the view is complete 423 and if another group is to be viewed, the process loops 424 and another group can be selected 422 and the content displayed. If the view action is complete 425, the process awaits the next "Get Action" 402 command.

If the action is to delete a group 430, the group to be deleted is selected 431. A confirmation of the deletion of the group 432 is requested. It is determined if there is another group to be deleted 433 and, if so, the process loops 434 to select the next group to be deleted 431. If the deletion is complete 435, the process awaits the next "Get Action", 402 command.

If the action is to update a group 440, the group to be updated is selected 441. The group contents is modified 442. It is then determined if there is another group to be updated 443 and, if so, the process loops 444 to select the next group to be updated 441. If there are no more groups to be updated 445, the process awaits the next "Get Action" 402 command.

An additional action may be to exit 404 the group management process to end the session 405.

The following is an example that demonstrates an embodiment how nested groups may be defined. Many different rules for nesting groups could be applied in this way and this design represents just one embodiment.

Firstly, the behaviour of combining groups is examined by looking at the effect of using two single groups (A and B) and then nesting these groups as part of another group (C). Secondly, the effect of combing the new group C with another group X is considered.

A group A is defined that contains events e1, e2 and e3. This group may be marked as active or inactive, in other words all events would be recorded if the group is active and all events would be discarded if the group was inactive. Another group B is defined, which contains events e2, e4 and e5. Again, if the group is marked as active all events would be recorded, whereas no events would be recorded if the group is marked inactive.

At this stage the groups A and B only contain event ids, they do not contain any group names. Groups A and B can be combined to nest them as part of group C. The effect of combining the groups depends on the events defined within the groups, the status of the group (active/inactive), and some simple rules to handle multiple entries for events with the same event id.

The following considers how group C may be formed by combining groups A and C. There are four permutations, they are A+B, A−B, B+A, and B−A.

A+B

If both groups are active then events e1, e2, e3, e4 and e5 are recorded. The event instance e2 in group A is over written by the event instance e2 from group B. This is a rule—if an event point is defined in more than one group, the entry in the last group is the entry used. If both groups were marked inactive then the events e1, e2, e3, e4 and e5 would have all been discarded.

Now consider the effect if the active/inactive status for the groups were different.

Firstly, if group A is active and group B is inactive. In this case events e1 and e3 would be recorded, and events e2, e4 and e5 would be discarded. If the group activity were reversed, such that group A was inactive and group B was active, then events e2, e4 and e5 would be recorded and events e1 and e3 would be discarded.

The outcome for groups A+B is summarised in the following table, which shows the events recorded i.e. the active events of group C. In the table the event ids that are not shown are inactive within group C.

|  | B | |
| --- | --- | --- |
| A | ACTIVE | INACTIVE |
| ACTIVE | e1, e2, e3, e4, e5 | e1, e3 |
| INACTIVE | e2, e4, e5 | |

A−B

In this case, any events defined in group A are dropped if they are also defined in group B. Entries in group B that do not appear in group A are ignored. Hence, in the given example, this leaves event ids e1 and e3. If group A is marked active—they are recorded. If group A is marked inactive—they are discarded. The outcome for groups A−B is summarised in the following table, which shows the events recorded:

| A | |
| --- | --- |
| ACTIVE | e1, e3 |
| INACTIVE | |

B+A

If both groups are active or inactive then the outcome is exactly the same as above for A+B. In this case, the event instance of e2 from group B is overwritten by the event instance e2 from group A, but as both groups have the same activity status the result is the same. Now consider what occurs if the group statuses are different. Firstly, if group B is active and group A is inactive—in this case events e4 and e5 are recorded, while events e1, e2 and e3 are discarded. Secondly, if group B is inactive and group A is active —then events e4 and e5 are discarded while events e1, e2 and e3 are recorded. The outcome for groups B+A is summarised in the following table, which shows the events recorded:

|   | B | |
|---|---|---|
| A | ACTIVE | INACTIVE |
| ACTIVE | e1, e2, e3, e4, e5 | e1, e2, e3 |
| INACTIVE | e4, e5 | |

B−A

In this case the event ids that are associated with the status of group B are e4 and e5. They will be written or discarded depending upon the status of group B. Events ids e1, e2 and e3 are deemed to be undefined. The outcome for groups B−A is summarised in the following table, which shows the events recorded:

| B | |
|---|---|
| ACTIVE | INACTIVE |
| e4, e5 | |

The above looks at the effect of nesting two groups. It can now be considered how that new group may be combined with another. For this group C is defined as being composed of groups A+B, and where both groups are active. That is group C contains event ids e1, e2, e3, e4 and e5.

The above shows that the statuses of groups A and B influence the events contained within group C. Once group C is defined, the status for all the contained events is determined by whether group C is active or inactive. This is a rule that the activity status is defined by the group at the highest level.

Another group X is defined which contains events e3 and e6. Group X can be combined with group C by nesting them in new group M.

Applying the same steps to groups C and X as above, produces the following summary tables of active events for group M:

C+X

|   | X | |
|---|---|---|
| C | ACTIVE | INACTIVE |
| ACTIVE | e1, e2, e3, e4, e5, e6 | e1, e3, e4, e5 |
| INACTIVE | e2, e6 | |

C−X

| C | |
|---|---|
| ACTIVE | e1, e3, e4, e5 |
| INACTIVE | |

X+C

|   | X | |
|---|---|---|
| C | ACTIVE | INACTIVE |
| ACTIVE | e1, e2, e3, e4, e5, e6 | e1, e2, e3, e4, e5 |
| INACTIVE | e6 | |

X−C

| X | |
|---|---|
| ACTIVE | INACTIVE |
| e6 | |

Figure 5:
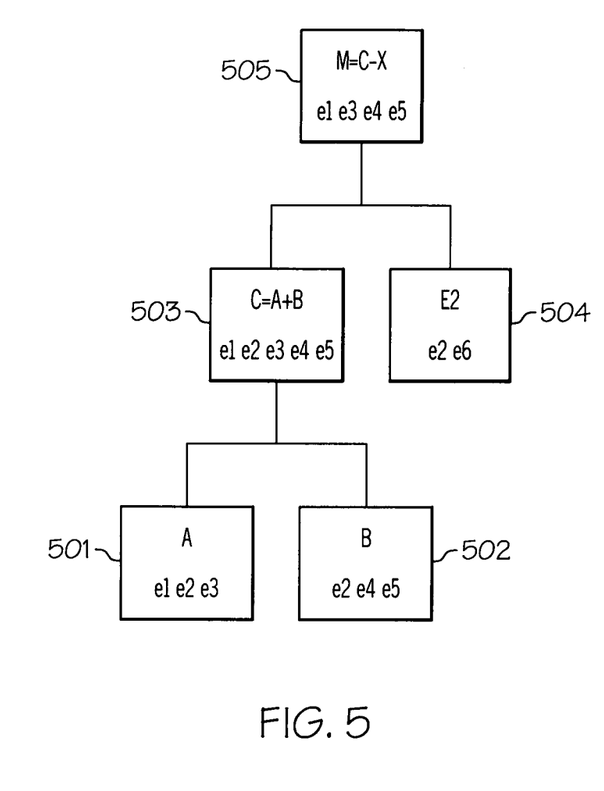
FIG. 5 is a diagram showing nesting of groups of events in accordance with the present invention.

FIG. 5 shows the hierarchy of this example of nested groups. In the figure, group A 501 and group B 502 are nested as A+B in group C 503. Group C 503 and group X 504 are nested as C−X in group M 505.

In the described example, group C was a nesting of groups A and B. Additional event points or further groups could have been defined. Group M was also defined, which contains nested groups C and X. Other groups or event entries could have been added. There is no technical limitation to the depth of nesting.

Referring back to the flow diagram of FIG. 4, the groups shown in FIG. 5 could be created using the following steps:
 Create Group A
 Add entries for event ids e1, e2, e3;
 Create Group B
 Add entries for event ids e2, e4, e5;
 Create Group C
 Add group definitions for A+B;
 Create Group X
 Add entries for event ids e2, e6;
 Create Group M
 Add group definition for C−X.

The described method and system removes the need to modify the definition of groups that contain event points or to define another whole group to change the behaviour of one or two event points. The above steps have shown how we can use nested groups to vary the behaviour for groups, and how by defining groups simple overrides can be provided to existing groups.

Figure 6:
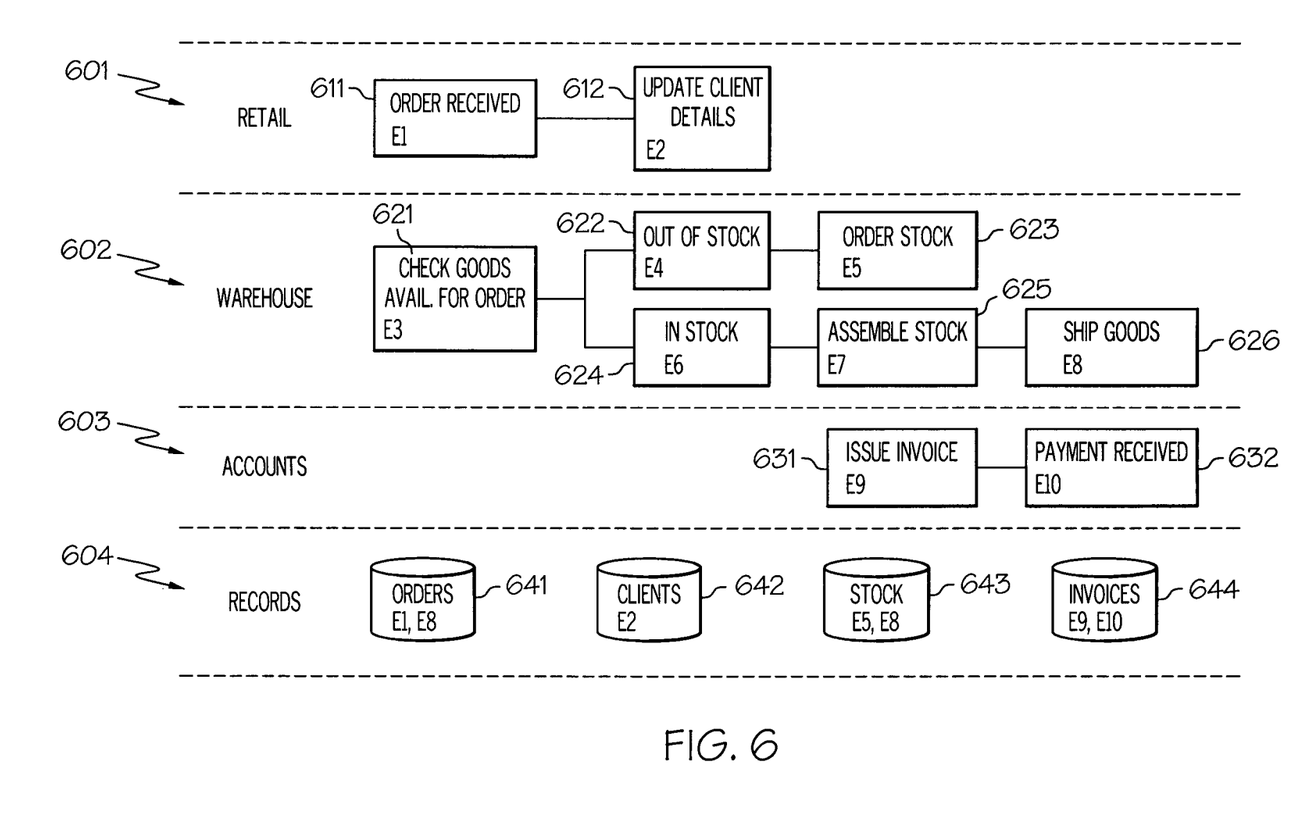
FIG. 6 is a schematic representation of business events in a system to be monitored in accordance with the present invention.

An example is now described in the context of business events. FIG. 6 shows a business flow 600 in which different business events are taking place which are handled by distributed components of the business solution. The components form the monitored environment 102 as described in relation to FIG. 1.

A retail component 601 of the business environment is shown in which events include receiving an order 611 and updating client records 612. A warehouse component 602 includes events of checking goods are available for an order 621, the goods being out of stock 622, ordering new stock 623, the goods being in stock 624, assembling the stock 625 and shipping the goods for the order 626. An accounting component 603 includes events of issuing an invoice 631 and receiving payment of an invoice 632.

A records component 604 includes resources for orders 641, clients 642, stock 643 and invoices 644. Events occur when any of the resources are updated. In this example, the resource for orders 641 is updated when an order is received 611 and when the goods are shipped 626; the resource for clients 642 is updated when clients detail are updated 612; the resource for stock 643 is updated when new stock is ordered 623 and when goods are shipped 626; the resource for invoices 644 is updated when an invoice is issued 631 and when payment of an invoice is received 632.

Base group can be defined as being events occurring in each of the components of the business environment. Group A is defined as including events in the retail component 601, {E1, E2}. Group B is defined as including events in the warehouse component 602, {E3, E4, E5, E6, E7, E8}. Group C is defined as including events in the accounts component 603, {E9, E10}. Group D is defined as including events of updates to records 604, {E1, E2, E5, E8, E9, E10}. The groups can be nested to define groups with members comprising a combination of events from the base groups.

For example, a nested Group M could be defined as Group A+Group C for events relating to retail and accounts, orders and invoices. A nested Group N could be defined as Group D−Group B for events relating to resource updates but excluding stock updates. If Group D is active, this would result in Group N={E1, E2, E9, E10} being defined. A nested Group X could be defined as Group A+Group B+Group C and activating Group X would result in activating all the events in these groups.

Individual events such as business process events can be collected together into event groups for ease of configuration. A group of events can be activated or deactivated to enable or disable the generation of events defined in the group. In order to tailor the specific event generation or event recording which takes place, the events defined in groups must be changed to include or exclude events. The described method combines two or more groups of events into a single group using combining rules such as union, exclusion and rules pertaining to the precedence of the groups. In this way, the groups of basic events need not change and individual events can be added or removed by using a combination of the basic groups and by configuring each group's active/deactive status.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

The invention claimed is:

1. A computer-implemented method for grouping events comprising:
    defining a plurality of base groups each defining a set of event points;
    combining groups to form a combined group having a set of event points defined by the combination of the event points in the combining groups; and
    activating or deactivating groups, within a processor of a computer, to enable or disable the generation of events defined by the event points in a group.

2. A computer hardware system for grouping events comprising:
    a processor;
    a definition module, running in the processor, for defining a plurality of base groups each defining a set of event points;
    a combining module for combining groups to form a combined group having a set of event points defined by the combination of the event points in the combining groups; and
    an activation/deactivation module for activating or deactivating groups to enable or disable the generation of events defined by the event points in a group.

3. A computer program product stored on a computer readable storage medium, comprising computer readable program code means for performing the steps of:
    defining a plurality of base groups each defining a set of event points;
    combining groups to form a combined group having a set of event points defined by the combination of the event points in the combining groups; and
    activating or deactivating groups to enable or disable the generation of events defined by the event points in a group.

4. The method as claimed in claim 1, wherein the step of combining groups combines any combination of base groups, combined groups and event points.

5. The method as claimed in claim 1, wherein the step of combining is in accordance with predefined combining rules including a union of groups and an exclusion of groups.

6. The method as claimed in claim 1, wherein event points are defined in groups by unique event identifiers.

7. The method as claimed in claim 1, wherein if an event point is defined in more than one combining group, the entry of the event point in the last combining group in the combination is used.

8. The method as claimed in claim 1, wherein each group has an activity status of active or inactive and event instances are monitored for event points in groups which are active.

9. The method as claimed in claim 8, wherein the activity status of combining groups changes the event points defined in a combined group.

10. The method as claimed in claim 8, wherein the activity status is defined by the group at the highest level.

11. The method as claimed in claim 1, wherein the generation of events records event instances of the event points for analysis.

12. The method as claimed in claim 1, wherein the generation of events provides an alert for an event instance of predetermined value.

13. The method as claimed in claim 1, wherein the generation of events triggers a further event or activity.

14. The method as claimed in claim 1, wherein the generation of events publishes the event instances for the event points.

15. The method as claimed in claim 1, wherein the events are business events.

16. The system as claimed in claim 2, wherein the system includes a managing module for managing groups including means for creating, viewing, deleting and updating groups.

17. The system as claimed in claim 2, wherein the system includes a searching module for searching in a monitored environment for event points defined in activated groups.

18. The system as claimed in claim 2, wherein the system includes a recording module for recording event instances of the event points for analysis.

19. The system as claimed in claim 2, wherein the system includes an alert module for providing an alert for an event instance of predetermined value.

20. The system as claimed in claim 2, wherein the system includes a triggering module for triggering a further event or activity in response to an event instance.

21. The system as claimed in claim 2, wherein the system includes a publishing module for publishing event instances.

22. The system as claimed in claim 2, wherein the system is an event monitoring system and the events are business events.

\* \* \* \* \*